(12) United States Patent
Kumeta et al.

(10) Patent No.: US 12,391,840 B2
(45) Date of Patent: Aug. 19, 2025

(54) INK JET INK COMPOSITION AND RECORDING METHOD

(71) Applicant: Seiko Epson Corporation, Tokyo (JP)

(72) Inventors: Hiroaki Kumeta, Matsumoto (JP); Kenta Kikuchi, Suwa (JP)

(73) Assignee: SEIKO EPSON CORPORATION (JP)

( * ) Notice: Subject to any disclaimer, the term of this patent is extended or adjusted under 35 U.S.C. 154(b) by 447 days.

(21) Appl. No.: 17/726,575

(22) Filed: Apr. 22, 2022

(65) Prior Publication Data

US 2022/0340770 A1     Oct. 27, 2022

(30) Foreign Application Priority Data

Apr. 23, 2021   (JP) ................. 2021-073549

(51) Int. Cl.
| | | |
|---|---|---|
| C09D 11/324 | (2014.01) | |
| B41J 2/01 | (2006.01) | |
| B41J 2/21 | (2006.01) | |
| C09D 11/102 | (2014.01) | |
| C09D 11/108 | (2014.01) | |
| C09D 11/322 | (2014.01) | |
| C09D 197/00 | (2006.01) | |

(52) U.S. Cl.
CPC ............... *C09D 11/324* (2013.01); *B41J 2/01* (2013.01); *B41J 2/2107* (2013.01); *C09D 11/102* (2013.01); *C09D 11/108* (2013.01); *C09D 11/322* (2013.01); *C09D 197/00* (2013.01); *C09D 197/005* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | | |
|---|---|---|---|---|
| 5,268,027 | A  * | 12/1993 | Chan ...................... | C09D 11/30 106/31.86 |
| 2013/0165531 | A1* | 6/2013 | Shi ......................... | C09B 63/005 514/769 |
| 2014/0060382 | A1* | 3/2014 | Adamic .................. | C09D 11/36 106/31.13 |
| 2017/0015852 | A1* | 1/2017 | Benohoud ............. | C09D 11/037 |
| 2018/0237647 | A1* | 8/2018 | Yamada .................... | B41J 2/01 |
| 2018/0258300 | A1* | 9/2018 | Miyake ................... | B41J 2/1752 |
| 2022/0348782 | A1 | 11/2022 | Palmer | |

FOREIGN PATENT DOCUMENTS

| | | |
|---|---|---|
| JP | 2019-085474 A | 6/2019 |
| WO | 2021-062312 A1 | 4/2021 |

* cited by examiner

Primary Examiner — Manish S Shah
(74) Attorney, Agent, or Firm — Harness, Dickey & Pierce, P.L.C.

(57) ABSTRACT

An ink jet ink composition includes water, a plant-derived carbonized color material, and a lignin resin.

7 Claims, No Drawings

INK JET INK COMPOSITION AND RECORDING METHOD

The present application is based on, and claims priority from JP Application Serial Number 2021-073549, filed Apr. 23, 2021, the disclosure of which is hereby incorporated by reference herein in its entirety.

BACKGROUND

1. Technical Field

The present disclosure relates to an ink jet ink composition and a recording method.

2. Related Art

Since being capable of recording a highly fine image by a relatively simple apparatus, an ink jet recording method has been rapidly developed in various fields. In particular, in order to more stably obtain a high-quality recorded matter, various studies have been carried out.

For example, JP-A-2019-85474 has disclosed an ink jet ink used for FC (film coating) tables, and this ink jet ink is a water-based ink and has a preferable drying property and an excellent fixability to tablets. This ink jet ink contains a plant charcoal powder dye, a polyglycerin fatty acid ester, and water, the polyglycerin fatty acid ester has 8 to 12 carbon atoms, and a content of a water-soluble organic solvent with respect to the total mass of the ink is 5 percent by weight or less.

However, in particular, since the ink jet ink disclosed in JP-A-2019-85474 is primarily used as an edible ink or a tablet-printing ink each of which is not required to have a high color development property, a color material concentration of the plant charcoal powder dye is low, and when being applied to applications other than the printing described above, this ink jet ink is inferior in color development property (see Examples). In addition, when the color material concentration of the plant charcoal powder dye is increased in order to enhance the color development property of this ink, reliability, such as a re-dispersion property and/or a clogging recovery property, is disadvantageously not superior. In addition, when a particle diameter of the color material of the plant charcoal powder dye is decreased, because of evaporation of water and/or a solvent, an increase in viscosity and/or gelation may be generated, and as a result, a change in viscosity may disadvantageously occur. Furthermore, if the color material is used while the particle diameter thereof is not decreased, when the ink is ejected, a problem in that clogging of nozzles is generated may arise.

SUMMARY

Through intensive research carried out by the present inventors to solve the problems described above, it was found that by using an ink jet ink composition which contains water, a plant-derived carbonized color material, and a lignin resin, the change in viscosity is suppressed, and as a result, the present disclosure was completed.

That is, according to an aspect of the present disclosure, there is provided an ink jet ink composition comprising: water, a plant-derived carbonized color material, and a lignin resin.

DESCRIPTION OF EXEMPLARY EMBODIMENTS

Hereinafter, an embodiment (hereinafter, referred to as "this embodiment") to perform the present disclosure will be described in detail. The following embodiment is an example to describe the present disclosure and is not intended to limit the present disclosure to the following contents. The present disclosure may be performed after being appropriately changed and/or modified without departing from the scope thereof.

Ink Jet Ink Composition

An ink jet ink composition (hereinafter, simply referred to as the "ink composition" in some cases) of this embodiment contains water, a plant-derived carbonized color material, and a lignin resin. The reasons the ink composition of this embodiment suppresses the change in viscosity are believed as described below. However, the reasons are not limited thereto. That is, in a related ink composition containing a plant-derived carbonized color material, when the concentration thereof is increased in order to enhance the color development property, the reliability, such as the re-dispersion property and/or the clogging recovery property, is not superior. In addition, when the particle diameter of the color material of the plant charcoal powder dye is decreased, because of evaporation of water and/or a solvent, the increase in viscosity and/or the gelation occurs, and as a result, the change in viscosity may be generated. Furthermore, if the color material is used without decreasing the particle diameter thereof, when the ink is ejected, nozzle clogging may arise. On the other hand, according to the ink composition of this embodiment, since the plant-derived carbonized color material and the lignin resin are both contained, even when a color material having a predetermined particle diameter or less is used, aggregation among particles of the carbonized color material is disturbed by the lignin resin, and the increase in viscosity and/or the gelation is suppressed from being generated, so that the change in viscosity is suppressed. Since the plant-derived carbonized color material contains a plant-derived constituent component, when this carbonized color material is simultaneously present with the lignin resin which is one of plant constituent components, it is believed that the stability is improved. In addition, even when a content of the carbonized color material is a predetermined amount or more, since the aggregation among the particles of the carbonized color material is disturbed by the lignin resin, the reliability, such as the re-dispersion property and/or the ejection stability, is excellent.

In this specification, the "ink jet ink composition" indicates an ink composition to be recorded (printed) on a recording medium using an ink jet method. The "recorded matter" indicates a matter to be formed such that an image is formed by recording an ink composition on a recording medium.

Carbonized Color Material

The ink composition of this embodiment contains a plant-derived carbonized color material (hereinafter, simply referred to as the "carbonized color material" in some cases). In this specification, the "plant-derived carbonized color material" indicates a carbonized color material obtained by treating plants under high-temperature conditions. In this case, although the "high-temperature conditions" is not particularly limited as long as plants can be carbonized, for example, there may be used high-temperature conditions at 250° C. or more known as so-called "charcoal making" in which plants, such as bamboo and wood, can be formed into ashes; high-temperature conditions at 350° C. or more in which non-carbonized components are believed to disappear; or high-temperature conditions at 700° C. or more using a charcoal kiln. The ink composition of this embodiment has an excellent color development property, contains a carbonized color material which can be prepared from plants, and can suppress the change in viscosity.

Although the carbonized color material is not particularly limited, for example, there may be mentioned a Japanese-made carbonized color material, such as a white charcoal, a Binchotan charcoal, a black charcoal, a briquette, a bamboo charcoal, a plum charcoal, or an activated charcoal; a mangrove charcoal, or a palm charcoal. Among those mentioned above, a Binchotan charcoal or a bamboo charcoal is preferable, and a Binchotan charcoal is more preferable.

The carbonized color material may be used alone, or at least two types thereof may be used in combination. A content of the carbonized color material with respect to the total mass of the ink composition is preferably 1.0 to 15 percent by mass, more preferably 3.0 to 10 percent by mass, and further preferably 5.0 to 8.0 percent by mass. Since the content of the carbonized color material is in the range described above, the change in viscosity is further suppressed, and the re-dispersion property and the ejection stability tend to be further improved.

Lignin Resin

The ink composition of this embodiment contains a lignin resin. In this specification, the "lignin resin" indicates a resin obtained by polymerization of a lignin monomer, such as p-coumaryl alcohol (p-hydroxycinnamyl alcohol), coniferyl alcohol, or synapyl alcohol. Since the ink composition contains a lignin resin, the change in viscosity can be suppressed.

Although the lignin resin is not particularly limited, for example, a lignin resin having a functional group, such as a sulfone group, a carboxy group, and/or a phenolic hydroxy group may be mentioned, and a lignin sulfonic acid having a sulfone group is preferable. As the lignin sulfonic acid, for example, a lignin sulfonic acid including a free sulfone group or a lignosulfonate salt in which a sulfone group forms a salt with magnesium, sodium, calcium, or the like may be mentioned, and a lignosulfonate salt is more preferable.

The lignin resin may be used alone, or at least two types thereof may be used in combination. A content of the lignin resin with respect to the total mass of the ink composition is preferably 1.0 to 30 percent by mass, more preferably 3.0 to 15 percent by mass, and further preferably 5.0 to 10 percent by mass. Since the content of the lignin resin is in the range described above, the change in viscosity is further suppressed, and the re-dispersion property and the ejection stability tend to be further improved.

A mass ratio (carbonized color material:lignin resin) of the carbonized color material to the lignin resin is preferably 1.0:0.1 to 1.0:5.0, more preferably 1.0:0.5 to 1.0:2.0, and further preferably 1.0:0.7 to 1.0:1.3. Since the mass ratio described above is in the range described above, the change in viscosity is further suppressed, and the re-dispersion property and the ejection stability tend to be further improved.

Color Material

The ink composition of this embodiment at least contains the carbonized color material and the lignin resin as the color material. In addition, the ink composition of this embodiment may further contain a known color material other than the carbonized color material and the lignin resin described above. As the known color material, for example, a pigment, such as an inorganic pigment and/or an organic pigment, may be mentioned.

Although the inorganic pigment is not particularly limited, for example, a carbon black (C.I. Pigment Black 7), such as a furnace black, a lamp black, an acetylene black, or a channel black, an iron oxide, or a titanium oxide may be used.

Although the organic pigment is not particularly limited, for example, there may be mentioned an azo pigment, such as an insoluble azo pigment, a condensed azo pigment, an azo lake, or a chelate azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dyestuff chelate (such as a basic dyestuff type chelate or an acidic dyestuff type chelate), a dyeing lake (a basic dyestuff type lake or an acidic dyestuff type lake), a nitro pigment, a nitroso pigment, an aniline black, or a daylight fluorescent pigment.

In view of the re-dispersion property and the ejection stability of the ink composition, an average particle diameter (D50) of the color material is preferably 50 to 500 nm, more preferably 100 to 400 nm, and further preferably 200 to 300 nm.

In this specification, the "average particle diameter" indicates an average particle diameter on a volume basis unless otherwise particularly noted. The average particle diameter can be measured by a particle size distribution measurement apparatus using a laser diffraction scattering method as a measurement principle. As a laser diffraction type particle size distribution measurement apparatus, for example, "Microtrac Series" (manufactured by MicrotracBEL) may be used.

Water-Soluble Organic Solvent

The ink composition of this embodiment preferably contains a water-soluble organic solvent. In this specification, a "water-soluble" compound indicates a compound which is usable with water and which has a property to be at least partially dissolved in water.

Although the type of water-soluble organic solvent is not particularly limited, for example, a monoalcohol, an alkylpolyol, a glycol ether, a cyclic nitrogen compound, or an aprotic polar solvent may be mentioned. The organic solvent of this embodiment may be appropriately selected and used from various types of water-soluble organic solvents among the organic solvents mentioned above.

The water-soluble organic solvent preferably includes an alkylpolyol. Since the ink composition contains an alkylpolyol, the alkylpolyol intrudes between lignin resin molecules by hydrogen bonds, and as a result, the re-dispersion property ands the ejection stability tend to be further improved.

Although the monoalcohol is not particularly limited, for example, there may be mentioned methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

Although the alkylpolyol is not particularly limited, for example, there may be mentioned glycerin, ethylene glycol, diethylene glycol, triethylene glycol, a polyethylene glycol, propylene glycol (1,2-propanediol), dipropylene glycol, 1,3-propylene glycol (1,3-propanediol), isobutylene glycol (2-methyl-1,2-propanediol), 1,2-butanediol, 1,3-butylene glycol (1,3-butanediol), 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, or 1,8-octanediol. Among those mentioned above, glycerin, propylene glycol, or 1,3-butyelen glycol is preferable.

Although the glycol ether is not particularly limited, for example, there may be mentioned diethylene glycol monon-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, or dipropylene glycol mono-iso-propyl ether.

Although the aprotic polar solvent is not particularly limited, for example, there may be mentioned cyclic ketone compound, a chain ketone compound, or a chain nitrogen compound. In addition, as the cyclic nitrogen compound and the aprotic polar solvent, a solvent, such as a pyrrolidone, an imidazolidinone, a sulfoxide, a lactone, an amide ether, or an imidazole, may be mentioned as a typical example. Although the pyrrolidone is not particularly limited as long as having a pyrrolidone skeleton, for example, there may be mentioned 2-pyrrolidone, an N-alkyl-2-pyrrolidone, or a 1-alkyl-2-pyrrolidone. As the imidazolidinone, for example, 1,3-dimethyl-2-imidazolidinone may be mentioned; as the sulfoxide, for example, dimethylsulfoxide may be mentioned; as the lactone, for example, γ-butyrolactone may be mentioned; and as the imidazole, for example, imidazole, 1-methylimidazole, 2-methylimidazole, or 1,2-dimethylimidazole may be mentioned.

The water-soluble organic solvent may be used alone, or at least two types thereof may be used in combination. A content of the water-soluble organic solvent with respect to the total mass of the ink composition is preferably 1.0 to 70 percent by mass, more preferably 5.0 to 50 percent by mass, and further preferably 10 to 30 percent by mass. Since the content of the water-soluble organic solvent is in the range described above, the re-dispersion property and the ejection stability tend to be further improved.

Surfactant

The ink composition of this embodiment preferably contains a surfactant. In this specification, the "surfactant" indicates an agent to promote dissolution of the water-soluble organic solvent in the ink composition, in particular, in water.

Although the surfactant is not particularly limited, for example, an acetylene glycol-based surfactant, an alkyl ether-based surfactant, a fluorine-based surfactant, or a silicone-based surfactant may be mentioned.

Although the acetylene glycol-based surfactant is not particularly limited, for example, at least one selected from 2,4,7,9-tetramethyl-5-decyne-4,7-diol, an alkylene oxide adduct thereof, 2,4-dimethyl-5-decyne-4-ol, and an alkylene oxide adduct thereof is preferable. Although a commercially available product of the acetylene glycol-based surfactant is not particularly limited, for example, there may be mentioned Olfine E1010, PD-002W, PD-005, EXP4200, EXP4300, or WE-003 (trade name, manufactured by Nisshin Chemical Industry Co., Ltd.); or Surfynol 104E, 104PG50, 420, 465, 485, 61, 82, DF110D, DF37, DF75, or MD-20 (trade name, manufactured by Evonik Industries).

Although the alkyl ether-based surfactant is not particularly limited, for example, at least one selected from a polyoxyethylene 2-ethylhexyl ether, a polyoxyethylene oleyl ether, a polyoxyethylene tridecyl ether, a polyoxyethylene castor oil ether, a polyoxyethylene cetyl ether, a polyoxyethylene stearyl ether, a polyoxyethylene alkyl ether, and a polyoxyalkylene tridecyl ether is preferable. Although a commercially available product of the alkyl ether-based surfactant is not particularly limited, for example, there may be mentioned Newcol 1006, 1008, or 1020 (trade name, manufactured by Nippon Nyukazai Co., Ltd.); Noigen DL-0415, ET-116B, ET-106A, DH-0300, YX-400, or EA-160 (trade name, manufactured by DKS Co., Ltd.); or Emulgen 430 or 1108 (trade name, manufactured by Kao Corporation).

Although the fluorine-based surfactant is not particularly limited, for example, there may be mentioned a perfluoroalkyl sulfonate salt, a perfluoroalkyl carboxylate salt, a perfluoroalkyl phosphate ester, a perfluoroalkyl ethylene oxide adduct, a perfluoroalkyl alkyl betaine, or a perfluoroalkyl amine oxide compound. Although a commercially available product of the fluorine-based surfactant is not particularly limited, for example, there may be mentioned S-144 or S-145 (trade name, manufactured by Asahi Glass Co., Ltd.); FC-170C, FC-430, or Florade FC4430 (trade name, manufactured by Sumitomo 3M Limited); FSO, FSO-100, FSN, FSN-100, or FS-300 (trade name, manufactured by du Pont); or FT-250 or 251 (trade name, manufactured by Neos Co., Ltd.).

Although the silicone-based surfactant is not particularly limited, for example, a polysiloxane-based compound or a polyether modified organosiloxane may be mentioned. Although a commercially available product of the silicone-based surfactant is not particularly limited, in particular, for example, there may be mentioned SAG503A (trade name, manufactured by Nisshin Chemical Industry Co., Ltd.); BYK-306, BYK-307, BYK-333, BYK-341, BYK-345, BYK-346, BYK-347, BYK-348, or BYK-349 (trade name, manufactured by BYK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

Among those surfactants mentioned above, the acetylene glycol-based surfactant is preferable.

The surfactant may be used alone, or at least two types thereof may be used in combination. A content of the surfactant with respect to the total mass of the ink composition is preferably 0.05 to 2.5 percent by mass, more preferably 0.1 to 1.5 percent by mass, and further preferably 0.3 to 1.0 percent by mass. Since the content of the surfactant is in the range described above, the re-dispersion property and the ejection stability tend to be further improved.

Water

The ink composition of this embodiment contains water. As the water, for example, there may be mentioned pure water, such as ion exchange water, ultrafiltration water, reverse osmosis water, or distilled water, or water, such as ultrapure water, in which ionic impurities are removed as much as possible. In addition, in the case in which water sterilized by UV radiation or addition of hydrogen peroxide is used, generation of fungi and bacteria can be suppressed when the ink composition is stored for a long time. As a result, a storage stability of the ink composition tends to be further improved.

A content of the water with respect to the total mass of the ink composition is preferably 10 to 95 percent by mass, more preferably 40 to 90 percent by mass, and further preferably 60 to 85 percent by mass. Since the content of the water is in the range described above, the re-dispersion property and the ejection stability tend to be further improved.

The ink composition of this embodiment may also appropriately contain, besides the components described above, various additives including a dispersant (such as decaglyceryl monocaprylate) for the color material, resin particles, a solubilizing agent, a viscosity adjuster, a pH adjuster such as potassium hydroxide or triethanolamine, an antioxidant, a fungicide/antiseptic agent, an antifungal agent, a corrosion inhibitor, and/or a chelating agent (such as sodium ethylenediaminetetraacetate) to trap metal ions which influence the dispersion.

Recording Method

A recording method of this embodiment includes a step (hereinafter, referred to as the "adhesion step") of adhering the ink composition described above to a recording medium. In the adhesion step, in more particular, the ink composition is ejected on a recording medium by an ink jet method, so that a recorded matter is obtained. As this recording medium, for example, an absorbing recording medium or a non-absorbing recording medium may be mentioned. Although the recording method of this embodiment may be widely applied to recording media having various absorbing characteristics, such as a non-absorbing recording medium into which a water-soluble ink composition is difficult to permeate and an absorbing recording medium into which a water-soluble ink composition is easy to permeate, the recording method of this embodiment is preferably applied to an absorbing recording medium.

As the absorbing recording medium, there may be mentioned various types of recording media including from regular paper, such as electrophotographic paper, having a high liquid permeability and ink jet paper (ink jet exclusive paper having an ink absorbing layer formed from silica particles or aluminum particles or having an ink absorbing layer formed from a hydrophilic polymer, such as a poly(vinyl alcohol) (PVA) or a poly(vinyl pyrrolidone) (PVP)) to art paper, coated paper, and cast paper, each of which has a relatively low ink permeability and is used for general offset printing.

As the non-absorbing recording medium, in particular, for example, there may be mentioned a film or a plate of a plastic, such as a poly(vinyl chloride), a polyethylene, a polypropylene, or a poly(ethylene terephthalate) (PET); a plate of a metal, such as iron, silver, copper, or aluminum; a metal plate or a plastic film formed by deposition of at least one of the above various metals; or a plate of an alloy, such as stainless steel or brass.

In this embodiment, in order to promote drying of the ink composition, a heating step of heating the recording medium may be performed at least one time before, during, and/or after the recording. A heating device is not particularly limited as long as having a temperature control system, and for example, a method using a radiation heating type sheath heater or infrared heater, a contact heating type sheet heater, an electromagnetic wave, or the like may be mentioned. A heating temperature is preferably 40° C. to 80° C. as a surface temperature of the recording medium. Furthermore, a ventilation step by a fan or the like may also be performed.

The recording method of this embodiment may also include, besides the steps described above, at least one known step of a related ink jet recording method.

EXAMPLES

Hereinafter, although the present disclosure will be described in detail with reference to Examples and Comparative Examples, the present disclosure is not limited at all to the following Examples and Comparative Examples as long as not departing from the scope of the present disclosure.

Materials used for the color materials in the following Examples and Comparative Examples are as shown below.

Carbonized Color Material

Binchotan charcoal (manufactured by Kiriya Chemical Co., Ltd., fine Binchotan charcoal powder (produced in Kisyu))

Bamboo charcoal (manufactured by Kiriya Chemical Co., Ltd., bamboo charcoal powder (made in Japan) Pigment Carbon black (represented by "CB" in the table)

Lignin Resin

San X P252 (sodium lignosulfonate, trade name, manufactured by Nippon Paper Chemicals Co., Ltd.)

San X P321 (magnesium lignosulfonate, trade name, manufactured by Nippon Paper Chemicals Co., Ltd.)

Vanilex N (highly pure partially desulfonated sodium lignosulfonate, trade name, manufactured by Nippon Paper Chemicals Co., Ltd.)

Dispersant

Decaglyceryl monocaprylate ("SY-Glyster MCA-750", trade name, manufactured by Sakamoto Yakuhin Kogyo Co., Ltd.) Water Pure Water Preparation of Color Material After the carbonized color material or the pigment was added in a solution in which the lignin resin or the dispersant was dissolved to form the composition shown in the following table 1, the mixture thus formed was processed for 2 hours by a dispersion treatment using a pin type horizontal bead mill with 0.3-mm zirconia beads, so that each color material was obtained. In addition, in the following Table 1, the numerical value represents a solid content, the unit represents percent by mass, and the total represents 100.0 percent by mass.

TABLE 1

|  |  | COLOR MATERIAL 1 | COLOR MATERIAL 2 | COLOR MATERIAL 3 | COLOR MATERIAL 4 | COLOR MATERIAL 5 |
| --- | --- | --- | --- | --- | --- | --- |
| CARBONIZED COLOR MATERIAL | BINCHOTAN CHARCOAL | 10 | 10 | 10 | — | 10 |
|  | BAMBOO CHARCOAL | — | — | — | 10 | — |
| PIGMENT | CB | — | — | — | — | — |
| LIGNIN RESIN | SAN X P252 | 10 | — | — | 10 | 20 |
|  | SAN X P321 | — | 10 | — | — | — |
|  | VANILEX N | — | — | 10 | — | — |
| DISPERSANT | DECAGLYCERYL MONOCAPRYLATE | — | — | — | — | — |

TABLE 1-continued

| | | | | | | |
|---|---|---|---|---|---|---|
| OTHER PARTICLE DIAMETER | WATER D50[nm] | BALANCE 230 | BALANCE 230 | BALANCE 230 | BALANCE 250 | BALANCE 235 |

| | | COLOR MATERIAL 6 | COLOR MATERIAL 7 | COLOR MATERIAL 8 | COLOR MATERIAL 9 | COLOR MATERIAL 10 |
|---|---|---|---|---|---|---|
| CARBONIZED COLOR MATERIAL | BINCHOTAN CHARCOAL | 10 | 15 | — | 10 | 10 |
| | BAMBOO CHARCOAL | — | — | — | — | — |
| PIGMENT | CB | — | — | 10 | — | — |
| LIGNIN RESIN | SAN X P252 | 5.0 | 15 | 10 | — | 25 |
| | SAN X P321 | — | — | — | — | — |
| | VANILEX N | — | — | — | — | — |
| DISPERSANT | DECAGLYCERYL MONOCAPRYLATE | — | — | — | 10 | — |
| OTHER PARTICLE DIAMETER | WATER D50[nm] | BALANCE 250 | BALANCE 240 | BALANCE 230 | BALANCE 250 | BALANCE 235 |

Materials used for the ink compositions in the following Examples and Comparative Examples are as shown below.

Color Material

The color materials 1 to 10 shown in Table 1

Water-Soluble Organic Solvent

Propylene glycol 1,3-butylene glycol

Glycerin

Surfactant

Olfine E1010 (trade name, manufactured by Nisshin Chemical Industry Co., Ltd.)

Surfynol 104 (trade name, manufactured by Evonik Industries)

Water

Pure Water

Preparation of Ink Composition

The individual materials were mixed together to form the composition shown in the following Table 2 and were then sufficiently stirred, so that each ink composition was obtained. In addition, in the following Table 2, the numerical value represents a solid content, the unit represents percent by mass, and the total represents 100.0 percent by mass.

Re-Dispersion Property

After 0.5 g of each ink composition was dripped in a beaker, this ink composition was dried for 2 days in an environment at a temperature of 40° C. and a humidity of 20%. After the drying was performed, 30 g of pure water was added in the beaker, the dissolution state of the ink composition was observed after the ink composition was left for 30 seconds, and the re-dispersion property thereof was evaluated by the following evaluation criteria.

Evaluation Criteria

A: ink composition is fully dissolved.

B: more than half of ink composition is dissolved, but part thereof is not dissolved.

C: more than half of ink composition is not dissolved.

D: ink composition is not dissolved at all.

Change in Viscosity

Each ink composition was filled in a screw tube and was then left for 5 days in an environment at a temperature of 60° C. while the tube is sealed with a lid. The viscosity was measured before and after the ink composition was left, and by comparison with the viscosity (initial viscosity) obtained before the ink composition was left, the change in viscosity was evaluated by the following evaluation criteria.

Evaluation Criteria

A: Rate of change in viscosity is less than 5%.

B: Rate of change in viscosity is 5% to less than 10%.

C: Rate of change in viscosity is 10% to less than 20%.

D: Rate of change in viscosity is more than 20%.

Ejection Stability

By using an ink jet recording apparatus ("PX-S840", manufactured by Seiko Epson Corporation), each ink composition was filled in an ink cartridge of this ink jet recording apparatus and was then continuously printed on 50 sheets of A4-size regular paper to form a solid pattern at a duty of 100%. After the printing was performed, from the number of missing nozzles among the nozzles which ejected the ink composition, the ejection stability was evaluated by the following criteria.

Evaluation Criteria

A: Number of missing nozzles is less than 10.

B: Number of missing nozzles is 10 to less than 20.

C: Number of missing nozzles is 20 to less than 50.

D: Number of missing nozzles is 50 or more.

TABLE 2

| | | EXAMPLE 1 | EXAMPLE 2 | EXAMPLE 3 | EXAMPLE 4 |
|---|---|---|---|---|---|
| COLOR MATERIAL | TYPE | COLOR MATERIAL 1 | COLOR MATERIAL 2 | COLOR MATERIAL 3 | COLOR MATERIAL 1 |
| | CONTENT | 60 | 60 | 60 | 60 |
| WATER-SOLUBLE ORGANIC SOLVENT | PROPYLENE GLYCOL | 3.0 | 3.0 | 3.0 | — |
| | 1,3-BUTYLENE GLYCOL | — | — | — | 3.0 |
| | GLYCERIN | 10 | 10 | 10 | 10 |
| SURFACTANT | OLFINE E1010 | 0.5 | 0.5 | 0.5 | 0.5 |
| | SURFYNOL 104 | 0.5 | 0.5 | 0.5 | 0.5 |

TABLE 2-continued

| | | EXAMPLE 1 | EXAMPLE 2 | EXAMPLE 3 | EXAMPLE 4 |
|---|---|---|---|---|---|
| OTHER EVALUATION | WATER | BALANCE | BALANCE | BALANCE | BALANCE |
| | RE-DISPERSION PROPERTY | A | A | A | A |
| | CHANGE IN VISCOSITY | A | A | A | A |
| | EJECTION STABILITY | A | A | A | A |

| | | EXAMPLE 5 | EXAMPLE 6 | EXAMPLE 7 | EXAMPLE 8 |
|---|---|---|---|---|---|
| COLOR MATERIAL | TYPE | COLOR MATERIAL 4 | COLOR MATERIAL 5 | COLOR MATERIAL 6 | COLOR MATERIAL 1 |
| | CONTENT | 60 | 60 | 60 | 30 |
| WATER-SOLUBLE ORGANIC SOLVENT | PROPYLENE GLYCOL | 3.0 | 3.0 | 3.0 | 3.0 |
| | 1,3-BUTYLENE GLYCOL | — | — | — | — |
| | GLYCERIN | 10 | 10 | 10 | 10 |
| SURFACTANT | OLFINE E1010 | 0.5 | 0.5 | 0.5 | 0.5 |
| | SURFYNOL 104 | 0.5 | 0.5 | 0.5 | 0.5 |
| OTHER EVALUATION | WATER | BALANCE | BALANCE | BALANCE | BALANCE |
| | RE-DISPERSION PROPERTY | A | B | A | A |
| | CHANGE IN VISCOSITY | A | A | B | A |
| | EJECTION STABILITY | C | A | B | A |

| | | EXAMPLE 9 | EXAMPLE 10 | EXAMPLE 11 |
|---|---|---|---|---|
| COLOR MATERIAL | TYPE | COLOR MATERIAL 7 | COLOR MATERIAL 1 | COLOR MATERIAL 10 |
| | CONTENT | 66 | 60 | 60 |
| WATER-SOLUBLE ORGANIC SOLVENT | PROPYLENE GLYCOL | 3.0 | — | 3.0 |
| | 1,3-BUTYLENE GLYCOL | — | — | — |
| | GLYCERIN | 10 | 10 | 10 |
| SURFACTANT | OLFINE E1010 | 0.5 | 0.5 | 0.5 |
| | SURFYNOL 104 | 0.5 | 0.5 | 0.5 |
| OTHER EVALUATION | WATER | BALANCE | BALANCE | BALANCE |
| | RE-DISPERSION PROPERTY | B | B | C |
| | CHANGE IN VISCOSITY | A | A | A |
| | EJECTION STABILITY | B | A | A |

| | | COMPARATIVE EXAMPLE 1 | COMPARATIVE EXAMPLE 2 |
|---|---|---|---|
| COLOR MATERIAL | TYPE | COLOR MATERIAL 8 | COLOR MATERIAL 9 |
| | CONTENT | 60 | 60 |
| WATER-SOLUBLE ORGANIC SOLVENT | PROPYLENE GLYCOL | 3.0 | 3.0 |
| | 1,3-BUTYLENE GLYCOL | — | — |
| | GLYCERIN | 10 | 10 |
| SURFACTANT | OLFINE E1010 | 0.5 | 0.5 |
| | SURFYNOL 104 | 0.5 | 0.5 |
| OTHER EVALUATION | WATER | BALANCE | BALANCE |
| | RE-DISPERSION PROPERTY | A | B |
| | CHANGE IN VISCOSITY | D | D |
| | EJECTION STABILITY | A | D |

What is claimed is:

1. An ink jet ink composition comprising:
    water;
    a plant-derived carbonized color material;
    an acetylene glycol surfactant; and
    a lignin resin,
    wherein the plant-derived carbonized color material is obtained by subjecting plants to high-temperature conditions to carbonize the plants, and
    an amount of the lignin resin is in a range of 6 to 30% by mass respect to a total mass of the ink jet ink composition.

2. The ink jet ink composition according to claim 1, wherein a mass ratio (carbonized color material:lignin resin) of the carbonized color material to the lignin resin is 1.0:0.5 to 1.0:2.0.

3. The ink jet ink composition according to claim 1, wherein a content of the carbonized color material with respect to a total mass of the ink jet ink composition is 3.0 to 10 percent by mass.

4. The ink jet ink composition according to claim 1, wherein the lignin resin includes a lignosulfonate salt.

5. The ink jet ink composition according to claim 1, further comprising: a water-soluble organic solvent.

6. The ink jet ink composition according to claim 5, wherein the water-soluble organic solvent includes an alkylpolyol.

7. A recording method comprising:
    an adhesion step of adhering the ink jet ink composition according to claim 1 to a recording medium.

* * * * *